(12) United States Patent
Anderson et al.

(10) Patent No.: US 7,350,000 B2
(45) Date of Patent: Mar. 25, 2008

(54) USER INTERFACE FOR REPRESENTING LOGICAL PATH INFORMATION AND DISPLAYING AVAILABLE ADAPTERS IN A STORAGE SUBSYSTEM

(75) Inventors: Dale H. Anderson, Tucson, AZ (US);
Linda V. Benhase, Tucson, AZ (US);
Mary C. Burton, Tucson, AZ (US);
Amy N. Morris, San Jose, CA (US);
Kaur Ramandeep, Dublin, CA (US);
Amy L. Therrien, Tucson, AZ (US);
David V. Valverde, Tucson, AZ (US);
John E. Wrobel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 10/787,040

(22) Filed: Feb. 25, 2004

(65) Prior Publication Data
US 2005/0188127 A1 Aug. 25, 2005

(51) Int. Cl.
*G06F 3/00* (2006.01)
*G06F 13/00* (2006.01)
(52) U.S. Cl. .......................... 710/38; 710/8; 709/217; 709/228
(58) Field of Classification Search ............. 710/8, 710/38; 709/217, 228
See application file for complete search history.

(56) References Cited
U.S. PATENT DOCUMENTS

| | | | |
|---|---|---|---|
| 5,434,850 A | 7/1995 | Fielding et al. | |
| 6,044,442 A | 3/2000 | Jesionowski | |
| 6,160,813 A | 12/2000 | Banks et al. | |
| 6,421,711 B1 | 7/2002 | Blumenau et al. | |
| 6,789,141 B2 * | 9/2004 | Ayukawa et al. | 710/38 |
| 2002/0001307 A1 * | 1/2002 | Nguyen et al. | 370/386 |
| 2002/0103943 A1 * | 8/2002 | Lo et al. | 710/2 |
| 2002/0199073 A1 * | 12/2002 | Tamura et al. | 711/162 |
| 2003/0018756 A1 * | 1/2003 | Nguyen et al. | 709/220 |
| 2003/0200477 A1 * | 10/2003 | Ayres | 714/2 |
| 2005/0097243 A1 * | 5/2005 | Yamashita et al. | 710/38 |

FOREIGN PATENT DOCUMENTS

WO 00/39699 7/2000

* cited by examiner

*Primary Examiner*—Henry Tsai
*Assistant Examiner*—Scott Sun
(74) *Attorney, Agent, or Firm*—Scully, Scott, Murphy & Presser, P.C.

(57) ABSTRACT

A user interface facilitates copying data between storage resources, such as servers. A user selects a source storage resource and a target storage resource. Available adapters are displayed through which a path can be established between the selected source and target storage resources. The user selects at least one of the available adapters to configure the path to copy data from the selected source storage resource to the selected target storage resource. The list of available adapters is dynamically updated so that only currently available adapters are displayed. The displayed adapters may be further limited to those that are compatible with a certain path type selected by the user, such as adapters used for a unidirectional or a bi-directional path.

20 Claims, 5 Drawing Sheets

FIG. 4

| Source | Path | Target | Alert |
|---|---|---|---|
| ☐ 16277:22  SAID 0000 | Switch 0000016277  Choose Switch Port ▼ | SAID 0000  16496:18 | |
| ☐ 16277:22  SAID 0001 | Direct Connection | SAID 0001  16496:18 | |

FIG. 5

| Source | Path | Target |
|---|---|---|
| 16277:22  SAID 0000 | Switch 0000016277  Port: 0x00 | SAID 0000  16496:18 |
| 16277:22  SAID 0001 | Direct Connection | SAID 0001  16496:18 |

| Source | | Path | Target | Alert |
|---|---|---|---|---|
| ☐ ▣ 16277:22 | ☐ SAID 0000 | Switch | Choose Adapter ▽ ☐ 16496:18 | |
| ☐ ▣ 16277:22 | ☐ SAID 0001 | Direct Connection | ☐ SAID 0001 ☐ 16496:18 | |

ESS
▣ 16277
  ⌐ Paths
  ☐ LSS
    ☐ 22
    ☐ 23

| Resource | | To | Type | Status | | | | | | |
|---|---|---|---|---|---|---|---|---|---|---|
| | | | | Mfr. | Model | Serial # | Type | Value | ESCON | FCP | PPRC Paths |
| ☐ | 0000 | Storage | FCP | IBM | F20 | 18740 | SAID | 0000 | 0 | 1 | 1 |
| ☐ | 0001 | Storage | ESCON | IBM | F20 | 18554 | SAID | 0001 | 1 | 0 | 1 |

USER INTERFACE FOR REPRESENTING LOGICAL PATH INFORMATION AND DISPLAYING AVAILABLE ADAPTERS IN A STORAGE SUBSYSTEM

BACKGROUND OF THE INVENTION

1. Field of the Invention

The invention relates generally to the field of data storage in computer systems and, more specifically, to a copy services user interface for a storage subsystem for representing complex logical path information, and for displaying available adapters through which a remote copying path can be established.

2. Description of the Related Art

Computer storage devices such as storage servers have high-capacity disk arrays to backup data from external host systems, such as host servers. For example, a large corporation or other enterprise may have a network of servers that each store data for a number of workstations used by individual employees. Periodically, the data on the host servers is backed up to the high-capacity storage server to avoid data loss if the host servers malfunction. A storage server may also backup data from another storage server, such as at a remote site, in a peer-to-peer copying operation. The storage servers are also known to employ redundant systems to provide additional safeguards against data loss. The IBM Enterprise Storage Server (ESS) is an example of a storage server.

However, it is often difficult for the user to configure appropriate paths for copying data from a source storage server to a target storage server, and to ascertain complex logical path information once the paths are configured.

BRIEF SUMMARY OF THE INVENTION

To address these and other issues, the present invention describes a method and system for assisting a user in configuring appropriate paths for copying data from a source storage server to a target storage server, and for displaying complex logical path information once the paths are configured.

In a particular aspect of the invention, a method for copying data includes displaying a user interface from which a user selects a source storage resource and a target storage resource, and displaying available adapters, via the user interface, through which a path can be established between the selected source storage resource and the selected target storage resource. The user selects at least one of the available adapters, via the user interface, to configure the path to copy data from the selected source storage resource to the selected target storage resource.

A related apparatus and program storage device are also provided.

BRIEF DESCRIPTION OF THE DRAWINGS

These and other features, benefits and advantages of the present invention will become apparent by reference to the following text and figures, with like reference numbers referring to like structures across the views, wherein:

FIG. 4 illustrates a user interface for selecting a path between storage systems, such as an ESCON path;

FIG. 5 illustrates a user interface for displaying information regarding a selected path, and confirming a selection;

FIG. 6 illustrates a user interface for selecting a path between storage systems, such as a Fibre Channel Protocol (FCP) path; and FIG. 7 illustrates a user interface for displaying path status information.

DETAILED DESCRIPTION OF THE INVENTION

Figure 1:
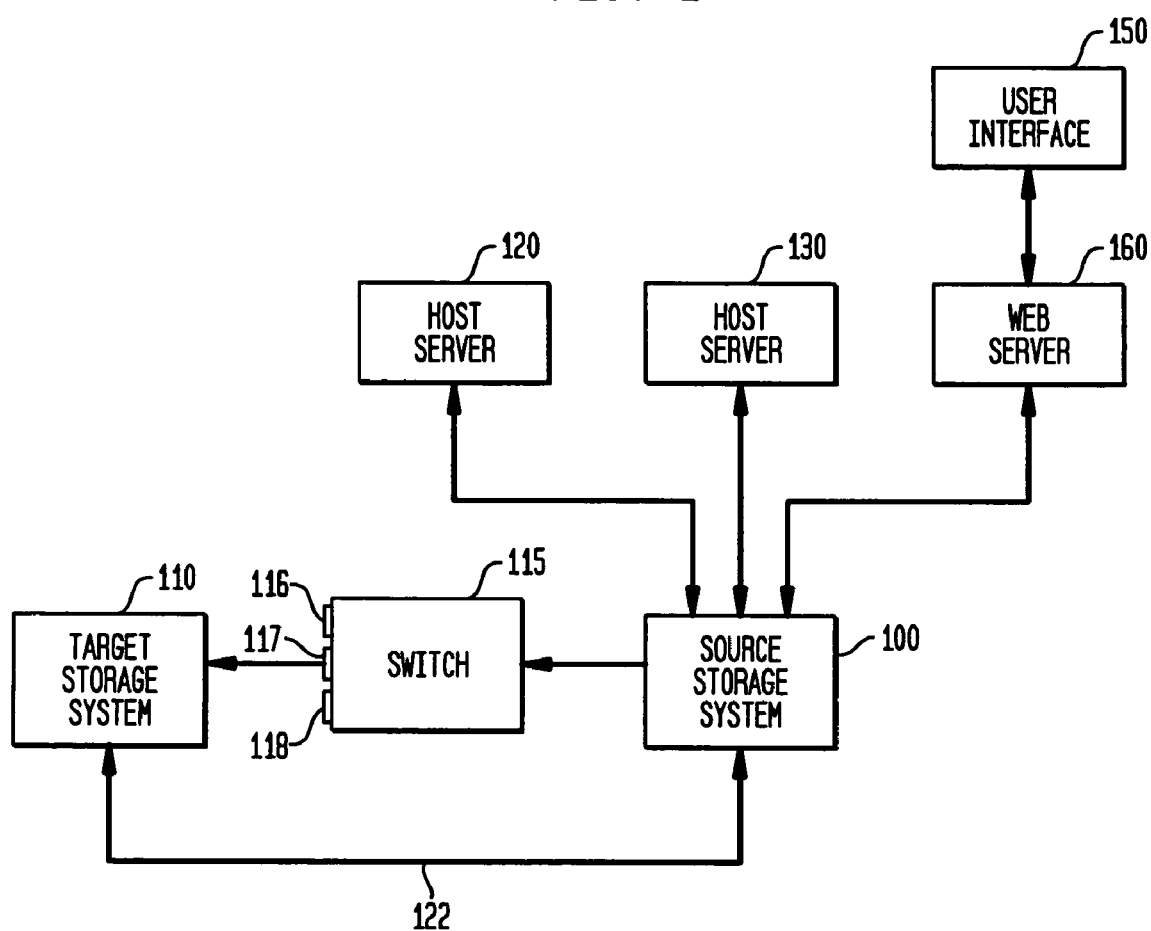
FIG. 1 illustrates an overview of storage systems, hosts, and a user interface in a computer system.

FIG. 1 illustrates an overview of storage systems, hosts, and a user interface in a computer system. Storage systems 100 and 110, which may be IBM Enterprise Storage Servers (ESSs), for instance, host servers 120 and 130 or other hosts, a user interface 150, and a web server 160, are illustrated in a simplified example. The storage systems 100 and 110 typically can connect to a variety of host servers, which may be servers that store data for different networks. The data of the storage system 100 may be mirrored to another storage system, such as storage system 110, which is typically at a remote site. Communication between the devices may be achieved using any desired communication protocol and medium.

The user interface 150 may include a workstation with video screen. The computing resources of the workstation run software to access information in the storage system 100 to generate a display that allows the user to set up source-target pairs of storage resources for copying data, and provides information regarding the status of copying activities in the storage system 100. For example, a distributed application may include a portion running on the user interface 150 and a portion running on a web server 160 that the user interface 150 communicates with. The web server 160, in turn, communicates with the storage systems 100 and 110. In the example illustrated, the storage system 100 is a source storage system that copies data to the storage system 110 as a target storage system. The web server 160 may communicate with different storage systems to enable the user to configure paths and to provide information regarding the configured paths.

The storage system 100 may copy data to the storage system 110 using a switched path or a direct connection (a non-switched path). With a switched path, a switch 115 is provided between the storage systems 100 and 110. The switch 115 may include a number of output ports 116, 117 and 118 as well as input ports, not shown. The storage system 100 configures the path to the storage system 110 by selecting one of the outgoing ports 116, 117 and 118 through which data will travel. For example, a switched path may be provided using serial interfaces at the storage systems 100 and 110 that communicated with the switch 115. IBM's enterprise systems connection (ESCON) card is one possible example. Such a path is typically configured as a unidirectional path, where data is transferred in only one direction at a time. A direct connection may be realized, e.g., via a fiber optic path 122 between the storage systems 100 and 110. For example, IBM's bi-directional Fibre-channel protocol (FCP) for open-systems hosts may be used. A direct connection may also be realized using ESCON.

Figure 2:
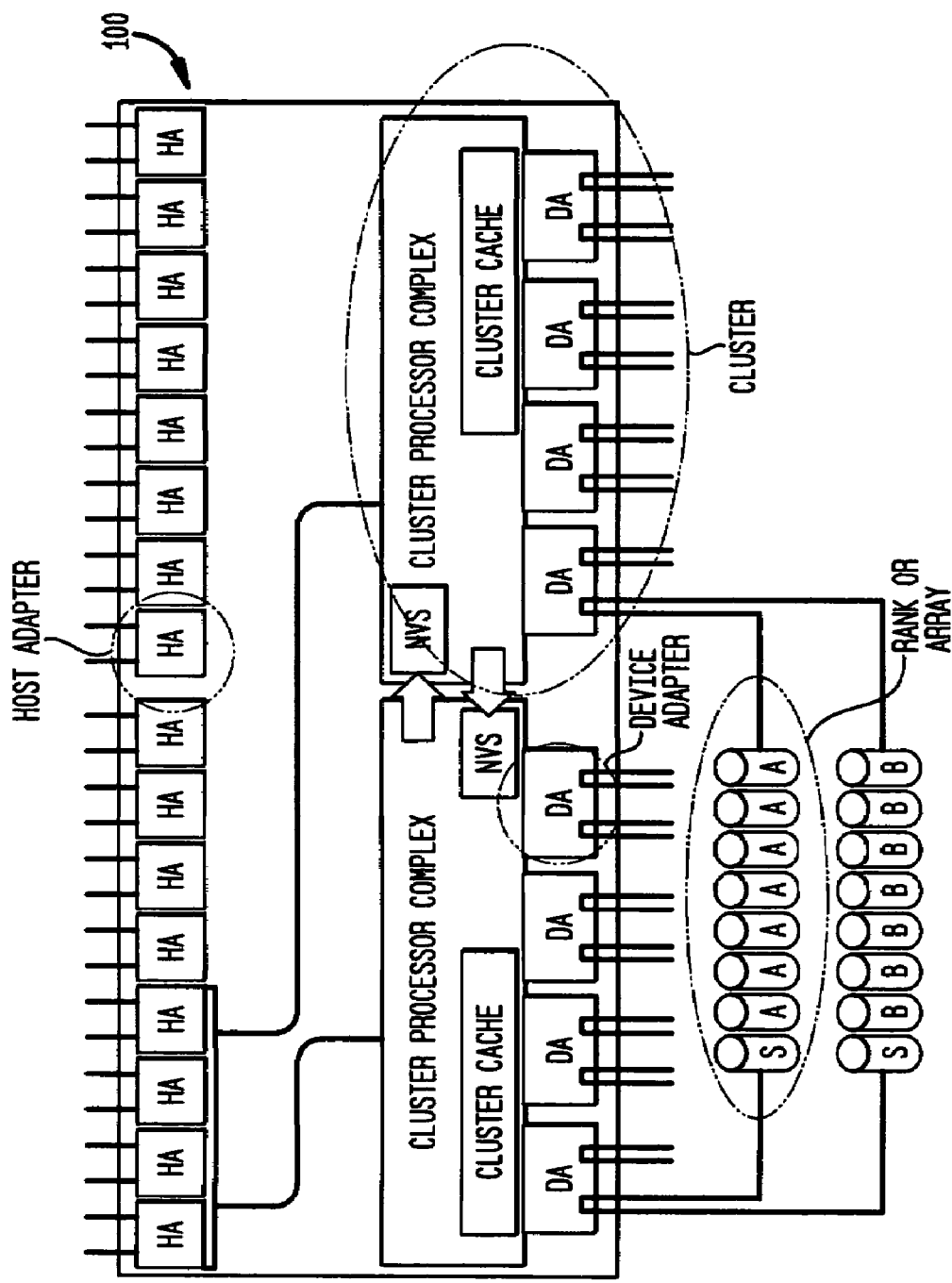
FIG. 2 illustrates an overview of a logical structure of a dual cluster storage server.

FIG. 2 illustrates an overview of a logical structure of the storage system 100. The example shown relates to the IBM ESS, which includes special features such as redundant storage resources that may not be used in other storage devices. However, the overview is an example only to show one way in which a storage system may connect to other devices and arrange the storage of data internally. The present invention does not require the specific configuration shown, and is suitable for use with other storage devices, as will be apparent to those skilled in the art.

The storage system 100 includes two clusters for redundancy. Each cluster includes a cluster processor complex, a cluster cache, and device adapters to connect disk storage resources to the cluster processor complexes. The cluster processor complexes each work independently. Each may contain symmetric multi processors with (volatile) cache, non-volatile storage/cache (NVS), and device adapters (DA). The device adapters, which are installed in pairs, one in each cluster, are used to connect disks to the cluster processor complexes. Each disk array or rank is attached to two DAs. The ranks can be configured as RAID 5 (redundant array of independent disks) or non-RAID arrays. In the ranks, "S" indicates a spare disk and "A" and "B" identify the rank.

A host adapter (HA) is a physical subunit of a storage server that provides the ability to attach to one or more host I/O interfaces. The IBM ESS has four HA bays, two in each cluster, and each bay supports up to four host adapters. For example, the storage system 110, host servers 120, 130 and the web server 160 may communicate with the storage system 100 via the HAs. Each HA connects to both cluster processor complexes so that either cluster can handle I/Os from any host adapter. A system adapter identification number (SAID) is a unique identification number automatically assigned to each HA.

A mix of various types of host adapters may be supported, such as a small computer systems interface (SCSI) card, which provides two SCSI ports, IBM's ESCON card, which provides two ESCON links, and a fibre-channel card. The fibre-channel card provides one fibre-channel port per HA that supports data transmission over fiber-optic cable using either of two data transmission protocols (not both simultaneously), namely the FCP for open-systems hosts, and the Fibre-connection (FICON) protocol for IBM S/390 or zSeries hosts. FICON is a data-transmission architecture based on the ANSI fibre-channel standard, which supports full-duplex communication. FCP is a protocol with five layers that define how fibre-channel ports interact through their physical links to communicate with other ports.

Processing resources in the storage systems 100 and 110 may maintain information regarding a hierarchy of storage resources. At the first, highest level of the hierarchy is the device level, which may include the storage systems 100 and 110 themselves. The second level represents storage resources within a storage system. For example, the storage systems 100 and 110 and hosts 120 and 130 may have logical subsystems (LSSs), which in turn are comprised of volumes, in the third level of the hierarchy. The LSS is a topological construct that includes a group of logical devices such as logical volumes, which may be units of recording medium associated with a logical disk drive. For example, a logical volume in a RAID array may be spread over the disks in the array. The units may include sectors of one or more disks.

The storage system 100 employs remote copying, such as peer-to-peer remote copying (PPRC), e.g., to copy data to the storage system 110. PPRC provides synchronous mirroring, and is typically used as a disaster recovery solution. It maintains a consistent copy of a logical volume on the same storage system or on another storage system. All modifications that any attached host performs on the primary logical volume are also performed on the secondary logical volume. A related type of copying, PPRC extended distance, maintains a fuzzy copy of a logical volume on the same storage system, e.g., ESS, or on another storage system. All modifications that any attached host performs on the primary logical volume are also performed on the secondary logical volume at a later point in time. The original order of update is not strictly maintained. Extended remote copying (XRC), e.g., between the storage system 100 and host 120 and 130, provides asynchronous mirroring. It assists a control program to maintain a consistent copy of a logical volume on another storage facility. All modifications of the primary logical volume by any attached host are presented in order to a single host. The host then makes these modifications on the secondary logical volume. XRC is generally used with mainframe host computers.

Figure 3:
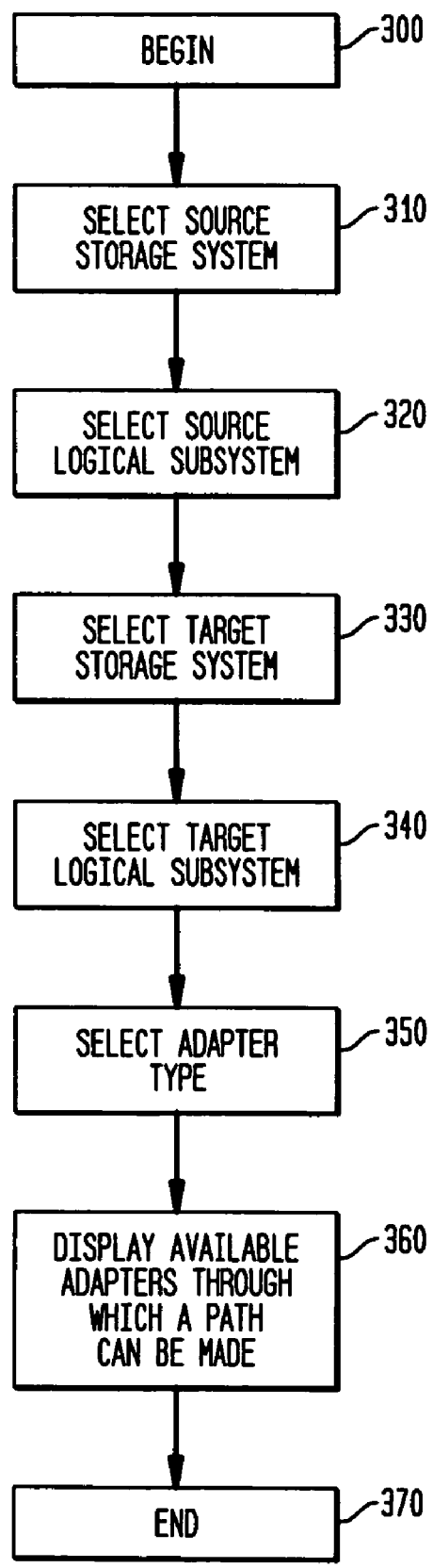
FIG. 3 illustrates a method for selecting a path between storage systems.

FIG. 3 illustrates a method for selecting a path between storage systems. In one aspect of the invention, a method and user interface are provided for displaying available adapters through which a remote copying path, such as for PPRC, can be established based on source and target system or subsystem selections. In an earlier web user interface (WUI), the user selected an adapter to use in creating a PPRC path after selecting a source subsystem. After that, the user specified the target storage subsystem. However, this procedure did not work for PPRC over Fibre because we needed the source and target subsystem in order to query for the Fibre Channel connectivity. In accordance with the invention, the user supplies the source and target subsystems via the WUI, e.g., user interface 150.

Then, we display the possible adapters on which a PPRC or other remote copying path can be established between the source and target subsystems. The user may specify the source and target subsystems used in creating remote copying paths. For example, in one possible approach, the user specifies PPRC over Fibre Channel and ESCON PPRC paths. The user interface 150 displays the possible adapters on which the copying path can be made, given the source and target subsystems specified. This procedure allows the user to configure the paths in a convenient and intuitive manner. The available adapters may be identified by the web server 160 sending a request for available adapters that can connect to a specified target storage resource, when the user interface 150 sends a connectivity request to the web server.

In particular, the user specifies the source subsystem with as many parameters as needed to identify it, such as the serial number or other identifier. The same is done for identifying the target subsystem. Then, the user can select which type of remote copying path is desired. For example, PPRC using ESCON or Fibre Channel Protocol may be used. Once the adapter type is defined, the adapters on which a path can be established between the selected source and target subsystems are displayed. The displayed adapters are those that are compatible with the selected path type. Equivalently, the user can select an adapter type. The user can select one of the adapters using any convenient interface device or widget, such as a drop down list.

In summary, an example method for selecting a path between storage systems begins at block 300. At block 310, the source storage system is selected. This is the system, sometimes referred to as a subsystem, from which data is to be copied. At block 320, the source logical subsystem from which the data is to be copied is selected. At block 330, the target storage system, to which the data is to be copied, is selected. At block 340, the target logical subsystem to which the data is to be copied, is selected. At block 350, the user selects the adapter type, as needed. At block 360, the available adapters, of a compatible type, and through which a path can be made, are displayed to the user. The process ends at block 370. Note that identification of the source and target storage resources can be tailored to the particular data storage scheme used. A scheme with the storage system and logical subsystem at different hierarchical levels is discussed as an example only.

The user interface 150 may use various devices to allow the user to identify the source and target storage resources. For example, the application running at the user interface 150 and web server 160 may display a list of storage systems to the user from which the user selects one as a source system using a checkbox or other device. The source logical subsystem (LSS) can similarly be identified by the user using appropriate interface tools. The target storage system and target LSS can similarly be identified.

A technique for displaying path information according to the invention depicts, in one possible implementation, both ESCON and Fibre connections, provides both physical and logical information needed to establish a path between logical subsystems, depicts switched and direct connection path information, and shows end-to-end path information so that the user can easily see source and target logical subsystems for creating paths.

A user selects path types "Enterprise Systems Connection" or "Fibre Channel Protocol" (ESCON or FCP, respectively), when establishing paths. Users select a checkbox for one or more (up to eight) desired paths from a list of available paths on a "Select Paths" panel. Paths may be a direct connection or a switched connection between storage systems, for instance. For direct connections, users choose relationships between source and target SAIDs, which identify the adapters. For a switched connection, users must choose the outgoing port (for ESCON) on the switch in addition to source and target SAIDs, or choose the target adapter (for FCP). The user may not continue until a port/adapter is chosen for each switch path selected. Only paths of one type or another (e.g., ESCON or FCP) are displayed.

As mentioned, when there is a switch involved, the user can select the target adapter(s) at the target storage resource. Moreover, selecting the target adapter applies to Fibre, whereas for ESCON, we supply the port on the switch. For a given adapter, we display information about the target of a given adapter when viewing adapter status, which could be a port on a switch or an adapter on a storage server such as an ESS.

After choosing paths, users can confirm selections made in a "Confirm Selections" panel. Users cannot make changes directly in this panel. Instead, if a user decides to change a selected adapter or adapters, they must go back and reselect the adapter or adapters on a "Select Paths" panel and reconfirm their selections.

The solution provided is advantageous since it clearly shows source-to-target relationships for paths in one view. Example user interfaces for implementing the invention are discussed below. The user interfaces may be provided as part of a wizard.

FIG. 4 illustrates a user interface 400 for selecting a path, such as an ESCON or other unidirectional path, between storage systems. As noted, the user interface 400 may be provided as part of a wizard. Prior to this panel, the user would have selected the source storage resource, such as a source ESS/LSS, a target storage resource, such as a target ESS/LSS and the adapter or path type, such as ESCON or FCP. In the interface 400, the user can select a desired path or paths based on previous choices. After the user selects a path or paths, a confirm selections panel is displayed (such as the interface 500 of FIG. 5). The confirm selections panel is suitable for use with different adapter types, and thus may apply to the case where an FCP adapter or other adapter type is used as well.

In the first row of the user interface 400, under the legend "Source", the source storage resource is identified by a serial number of the source storage server or ESS, which is "16277", an identifier of an LSS, which is "22", and a SAID. The system adapter identification number (SAID) is a unique identification number assigned to a host adapter used by the source storage resource. Under the legend "Path", a switch is identified by the identifier "0000016277", and a drop down menu can be used to select a switch port. For example, referring to FIG. 1, one of the output ports 116, 117 and 118 of the switch 115 may be selected. A port identified by "0:00" is displayed in the confirmation panel of FIG. 5. Under the legend "Target", the target storage resource is identified by a serial number of the source ESS, which is "16496", and an identifier of an LSS, which is "18", and a SAID.

In the second row of the user interface 400, similar information regarding the source and target resources is provided for a direct connection that has been configured.

Note that both the overall path status view and the path information in the wizards, including the list of available adapters and/or switch ports, can be dynamically updated. The user will see an "Alert" column in the establish path wizard panels for both ESCON and FCP. In particular, an Alert column to the right of the path selection area alerts the users to 1) whether or not a path currently has PPRC paths (represented by a "paths established" icon), and 2) whether or not a path has failed (represented by an "error" icon). The icons in the alert column are clickable, and users can obtain additional information on paths established or paths that have failed. Users do not need to make any changes in response to path alert items before proceeding in the wizard.

Regarding the dynamic updating of the path status on the adapter, let's say an adapter has a good path going through it. Then, for some reason, the path fails. We want to populate this up to the user interface to inform the user that the path in question is faulty. This path status is displayed for an adapter, given that an adapter can have various paths going through it. Also, a new path could have been established through a given adapter, and we want to display this in the user interface. Another possibility is that the adapter gets reconfigured to a protocol that is not handled. Therefore, we have to remove that adapter from the list of available adapters.

FIG. 5 illustrates a user interface 500 for displaying information regarding a configured path, and confirming a selection. The interface 500 may reflect selections made via the interface 400, for example. In the first row, the interface 500 displays the selected switch and port identifiers. In the second row, the interface 500 indicates that a direct connection has been selected.

FIG. 6 illustrates a user interface for selecting a path, such as a Fibre Channel Protocol (FCP) or other bi-directional path, between storage systems. The wizard for establishing an FCP path may have the same flow as the one for establishing an ESCON path.

In the first row of the user interface 600, under the legend "Source", the source storage resource is identified as discussed in connection with FIG. 4. The target storage resource is identified by a serial number of the source server or ESS, which is "16496", and an identifier of an LSS, which is "18". Under the legend "Path", the interface 600 denotes that a switched path is selected, and a drop down menu can be used to select an adapter. Any identifier, such as the SAID, can be used for the adapters. In accordance with the invention, the available and compatible adapters are displayed, based on the designated source and target storage resources, and the path/adapter type, to assist the user in the selection process. For example, assume there are sixteen adapters total at the source storage resource, with identifiers SAID 1, . . . , SAID 16. Assume further that SAID 1 through SAID 8 are compatible with a first path type such as ESCON, and SAID 9 through SAID 16 are compatible with a second path type such as FCP. Also assume that SAID 9 through SAID 12 are currently in use for other paths or are otherwise unavailable. Then, the interface 600 will inform the user, via the drop down menu, that SAID 13 through SAID 16 are available for establishing an FCP path.

The second row of the interface denotes that a direct connection is made, in which case the user does not need to select an adapter. The target for the direct connection is also identified.

Once the selections are made via the interface 600, a confirmation panel analogous to the interface 500 may appear to confirm the selections and display the relevant information regarding the configured paths.

FIG. 7 illustrates a user interface 700 for displaying path status information. The interface 700 can be selected at any time, such as by highlighting the "Paths" selection in the hierarchical tree display on the left hand side of the interface 700. In the tree display, the storage server or ESS is at the top of the tree. The serial number of a particular ESS, e.g., "16277" is provided at the second level. The third level provides the "Paths" node and LSS nodes. A "Status" region of the interface 700 provides information regarding one or more remote copying operations. A first row indicates that an FCP path from the ESS "16277" to a target resource (ESS) with an identifier "18740" has been established. A second row indicates that an ESCON path from the ESS "16277" to a target resource (ESS) with an identifier "18554" has been established. The field "Value" identifies the SAID number. The field "ESCON" identifies the number of ESCON paths. The field "FCP" identifies the number of FCP paths. The field "PPRC Paths" identifies the number of total PPRC paths.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for copying data, comprising:
displaying a user interface from which a user selects a source storage resource, a target storage resource and a type of remote copying path; and
automatically generating and displaying available adapters compatible with said type of remote copying path, via the user interface, through which a path can be established between the selected source storage resource and the selected target storage resource, a list of the available adapters displayed on the user interface being dynamically updated as a function of at least detecting one or more failed or newly established paths through the available adapters or detecting an adapter reconfigured to a protocol that is not handled, the list being updated by at least removing from said list the adapter reconfigured to a protocol that is not handled or adding an adapter via which a new path has been established between the source storage resource and the target storage resource;
wherein the user selects at least one of the available adapters, via the user interface, to configure the path to copy data from the selected source storage resource to the selected target storage resource.

2. The method of claim 1, wherein:
the selected source storage resource and the selected target storage resource comprise respective storage servers.

3. The method of claim 1, wherein:
the user selects the selected source storage resource by selecting, via the user interface, a source storage server and an associated logical subsystem.

4. The method of claim 1, wherein:
the user selects the selected target storage resource by selecting, via the user interface, a target storage server and an associated logical subsystem.

5. The method of claim 1, wherein:
the user selects a path type, via the user interface, from among a plurality of different path types; and
the displaying available adapters comprises displaying available adapters whose type is compatible with the selected path type.

6. The method of claim 5, wherein:
the plurality of different path types include unidirectional and bi-directional path types.

7. The method of claim 1, wherein:
the path comprises a switched path, wherein at least one switch is provided between the selected source storage resource and the selected target storage resource; and
the user selects an outgoing port of the at least one switch, via the user interface, to configure the path.

8. The method of claim 1, wherein:
the path comprises a switched path, wherein at least one switch is provided between the selected source storage resource and the selected target storage resource;
the available adapters include target adapters that are associated with the selected target storage resource; and
the user selects at least one of the target adapters to configure the path.

9. The method of claim 1, wherein:
the configured path comprises a direct connection between the selected source storage resource and the selected target storage resource.

10. The method of claim 1, further comprising:
displaying dynamically-updated status information, via the user interface, regarding the configured path.

11. The method of claim 1, further comprising:
providing a wizard, via the user interface, for guiding the user in selecting the selected source storage resource, the selected target storage resource, and the at least one of the available adapters.

12. A program storage device tangibly embodying a program of instructions executable by a machine to perform a method for copying data, the method comprising:
displaying a user interface from which a user selects a source storage resource, a target storage resource and a type of remote copying path; and
automatically generating and displaying available adapters compatible with said type of remote copying path, via the user interface, though which a path can be established between the selected source storage resource and the selected target storage resource, a list of the available adapters displayed on the user interface being dynamically updated as a function of at least detecting one or more failed or newly established paths through the available adapters or detecting an adapter reconfigured to a protocol that is not handled, the list being updated by at least removing from said list the adapter reconfigured to a protocol that is not handled or adding an adapter via which a new path has been established between the source storage resource and the target storage resource;

wherein the user selects at least one of the available adapters, via the user interface, to configure the path to copy data from the selected source storage resource to the selected target storage resource.

13. The program storage device of claim 12, wherein:

the user selects a path type, via the user interface, from among a plurality of different path types; and the displaying available adapters comprises displaying available adapters whose type is compatible with the selected path type.

14. The program storage device of claim 12, wherein:

the path comprises a switched path, wherein at least one switch is provided between the selected source storage resource and the selected target storage resource;

the available adapters include target adapters that are associated with the selected target storage resource; and the user selects at least one of the target adapters to configure the path.

15. The program storage device of claim 12, wherein the method further includes:

displaying dynamically-updated status information, via the user interface, regarding the configured path.

16. An apparatus for copying data, comprising:

means for displaying a user interface from which a user selects a source storage resource, a target storage resource and a type of remote copying path; and means for automatically generating and displaying available adapters compatible with said type of remote copying path, via the user interface, through which a path can be established between the selected source storage resource and the selected target storage resource, a list of the available adapters displayed on the user interface being dynamically updated as a function of at least detecting one or more failed or newly established paths though the available adapters or detecting an adapter reconfigured to a protocol that is not handled, the list being updated by at least removing from said list the adapter reconfigured to a protocol that is not handled or adding an adapter via which a new path has been established between the source storage resource and the target storage resource;

wherein the user selects at least one of the available adapters, via the user interface, to configure the path to copy data from the selected source storage resource to the selected target storage resource.

17. The apparatus of claim 16, wherein:

the user selects a path type, via the user interface, from among a plurality of different path types; and the means for displaying available adapters displays available adapters whose type is compatible with the selected path type.

18. The apparatus of claim 16, wherein:

the path comprises a switched path, wherein at least one switch is provided between the selected source storage resource and the selected target storage resource;

the available adapters include target adapters that are associated with the selected target storage resource; and the user selects at least one of the target adapters to configure the path.

19. The apparatus of claim 16, further comprising:

means for displaying dynamically-updated status information, via the user interface, regarding the configured path.

20. The method of claim 1, further including:

displaying the source storage resource, the target storage resource, and the available adapters providing path between the source storage resource and the target storage resource in one view; and allowing a user, via said one view, to obtain additional information associated with one or more newly established or failed paths through the available adapters or combination thereof.

* * * * *